(12) United States Patent
Glandt et al.

(10) Patent No.: US 9,735,435 B2
(45) Date of Patent: Aug. 15, 2017

(54) FLOW FIELD PLATE FOR ELECTROCHEMICAL FUEL CELL

(75) Inventors: Jeffrey Dean Glandt, Vancouver (CA); Bevan Hoskyn Moss, Vancouver (CA); Daniel Brent Mackay, New Westminster (CA)

(73) Assignee: Ballard Power Systems Inc., Burnaby (CA)

( * ) Notice: Subject to any disclaimer, the term of this patent is extended or adjusted under 35 U.S.C. 154(b) by 1127 days.

(21) Appl. No.: 13/583,176

(22) PCT Filed: Mar. 7, 2011

(86) PCT No.: PCT/US2011/027428
§ 371 (c)(1),
(2), (4) Date: Nov. 21, 2012

(87) PCT Pub. No.: WO2011/112520
PCT Pub. Date: Sep. 15, 2011

(65) Prior Publication Data
US 2013/0059228 A1    Mar. 7, 2013

Related U.S. Application Data

(60) Provisional application No. 61/311,450, filed on Mar. 8, 2010.

(51) Int. Cl.
| | |
|---|---|
| *H01M 8/04* | (2016.01) |
| *H01M 8/10* | (2016.01) |
| *H01M 8/026* | (2016.01) |
| *H01M 8/04119* | (2016.01) |
| *H01M 8/1007* | (2016.01) |

(52) U.S. Cl.
CPC ....... *H01M 8/026* (2013.01); *H01M 8/04156* (2013.01); *H01M 8/1007* (2016.02)

(58) Field of Classification Search
CPC .................................................. H01M 8/026
See application file for complete search history.

(56) References Cited

U.S. PATENT DOCUMENTS

| | | | |
|---|---|---|---|
| 5,728,446 | A | 3/1998 | Johnston et al. |
| 6,649,297 | B1 | 11/2003 | Marchand et al. |
| 7,087,337 | B2 | 8/2006 | Trabold et al. |
| 2005/0175883 | A1 | 8/2005 | Trabold et al. |
| 2009/0011310 | A1 | 1/2009 | Trabold et al. |
| 2009/0023029 | A1 | 1/2009 | Matsumoto et al. |

FOREIGN PATENT DOCUMENTS

| | | |
|---|---|---|
| CN | 101359742 A | 2/2009 |
| JP | 2002-343382 A | 11/2002 |
| JP | 2007-115620 A | 5/2007 |

*Primary Examiner* — Barbara Gilliam
*Assistant Examiner* — Stephan Essex
(74) *Attorney, Agent, or Firm* — Seed IP Law Group LLP

(57) ABSTRACT

A flow field plate comprises a first flow field; an opposing second flow field; and at least one flow channel formed in the first flow field, the at least one flow channel comprising: a first side and an opposing second side separated by an open-faced top and a bottom; and a first side channel formed in a portion of the open-faced top and in a portion of the first side along a continuous length of the at least one flow channel, the first side channel comprising a first side wall and a first bottom wall; wherein the first side wall of the first side channel and the first bottom wall of the first side channel form an obtuse angle in cross-section; and a depth of the bottom of the at least one flow channel is greater than a depth of the bottom wall of the first side channel.

15 Claims, 7 Drawing Sheets

FLOW FIELD PLATE FOR ELECTROCHEMICAL FUEL CELL

CROSS REFERENCE TO RELATED APPLICATION

This application claims benefit under 35 U.S.C. 119(e) to U.S. provisional patent application Ser. No. 61/311,450, filed on Mar. 8, 2010. This provisional application is incorporated herein by reference in its entirety.

BACKGROUND

Technical Field

The present invention relates to electrochemical fuel cells and, in particular, to flow field channel features for flow field plates.

Description of the Related Art

Fuel cells convert fuel and oxidant to electricity and reaction product. Proton exchange membrane fuel cells employ a membrane electrode assembly ("MEA") having a proton exchange membrane ("PEM") (also known as an ion-exchange membrane) interposed between an anode electrode and a cathode electrode. The anode electrode typically includes an electrocatalyst and an ionomer, or a mixture of electrocatalyst, ionomer and binder. The presence of ionomer in the electrocatalyst layer effectively increases the electrochemically active surface area of the electrocatalyst, which requires an ionically conductive pathway to the cathode electrocatalyst to generate electric current. The cathode electrode may similarly include electrocatalyst and binder and/or ionomer. Typically, the electrocatalyst used in the anode and the cathode is platinum or platinum alloy. Each electrode may further include a microporous, electrically conductive substrate, such as carbon fiber paper or carbon cloth, which provides structural support to the membrane and serves as a gas diffusion layer (GDL). The anode and cathode electrodes may be bonded or sealed to the PEM to form a single integral MEA unit.

The membrane electrode assembly is typically interposed between two electrically conductive flow field plates or separator plates. These flow field plates act as current collectors, provide support for the electrodes, and provide flow fields for the supply of reactants, such as fuel and oxidant, and removal of excess reactants and products that are formed during operation, such as product water. In some cases, the bipolar flow field plate is formed by joining two flow field plates together, namely, an anode flow field plate and a cathode flow field plate, so that an anode flow field is formed on one surface of the bipolar flow field plate, a cathode flow field is formed on an opposing surface of the bipolar flow field plate, and a coolant flow field is formed between the anode flow field plate and the cathode flow field plate. In other cases, the bipolar flow field plate may be a single plate that has an anode flow field on one surface and a cathode flow field on an opposing surface. The flow fields typically contain a plurality of landings, between which flow field channels are formed, and contact the electrodes of the MEA when assembled into a fuel cell. FIGS. 1-4 (prior art) collectively illustrate a typical design of a conventional MEA 5, with electrodes 1,3 sandwiching a proton exchange membrane 2 therebetween (FIG. 1); an electrochemical cell 10 comprising an MEA 5 between flow field plates 11, 12 (FIG. 2); a stack 50 of electrochemical cells 10 (FIG. 3); and stack 50 compressed between endplates 17, 18 (FIG. 4). FIGS. 1-4 each also illustrate manifolds 30 for delivering and removing reactants and products to and from the fuel cells during operation.

During fuel cell operation, a primary load is drawn from the fuel cell. At the anode electrode, fuel (typically in the form of hydrogen gas) reacts at the anode electrocatalyst in the presence of the PEM to form hydrogen ions and electrons. At the cathode electrode, oxidant (typically oxygen in air) reacts with the hydrogen ions, which pass through the PEM, in the presence of the cathode electrocatalyst to form water. The PEM also serves to isolate the fuel stream from the oxidant stream while facilitating the migration of the hydrogen ions from the anode to the cathode. The electrons pass through an external circuit, creating a flow of electricity to sustain the primary load.

In practice, fuel cells need to be robust to varying operating conditions, particularly to conditions in which liquid water accumulates in the flow field channels. When liquid water is present, some fuel cells in the fuel cell stack may exhibit a significantly higher flow resistance (i.e., less gas flow through the flow channel for a given pressure drop) than other fuel cells in the fuel cell stack. As a result, the lower flow resistance fuel cells will experience more gas flow than the higher flow resistance fuel cells, causing the higher flow resistance fuel cells to become starved of reactants and leading to a decrease in their voltage. Such flow resistance may vary from cell to cell and may randomly occur over time due to the presence of liquid water in the flow channel causing instabilities with regard to voltage and/or pressure.

A number of techniques have been proposed to remove liquid water in the flow channels or to keep liquid water from forming. In one example, the fuel cell stack can be operated at higher temperatures to reduce or prevent liquid water from forming. However, the maximum operating temperature is typically limited due to degradation of the components, such as degradation of the proton exchange membrane and seal materials, as well as corrosion of the carbonaceous components. In other examples, the flow channels can be designed to exhibit a higher pressure drop for a given flow rate and/or the reactants can be supplied at a higher flow rate (e.g., periodically purging) so that liquid water can be removed more easily. However, these techniques require relatively expensive fuel cell system design, more robust MEA components, and/or increased system parasitic losses.

Due to the shortcomings with modifying the operating conditions to remove liquid water, it has been suggested to modify the flow channel features such that water is wicked away from the electrodes. For example, U.S. Pat. No. 6,649,297 discloses a bipolar plate for a fuel cell comprising, on at least one of its faces, a groove able to form a gas distribution channel with the surface of an adjacent electrode, wherein the gas distribution channel has a shape or geometry such that the liquid of the biphasic flow flowing in the channel may be moved away from the electrode interface. In one preferred geometry, the channels have a transverse section in the shape of an isosceles trapezium, the sides of which (other than the bases) are equal and the small base of which is defined by the surface of the electrode. Stated differently, and as shown in FIG. 5 (prior art), the angles near the electrode (angle $\phi$) both have a larger value than the two opposite angles (angle $\beta$). However, such a distribution channel geometry is difficult to manufacture in high volumes using low-cost plate molding, embossing, or machining techniques.

In another example, U.S. Pat. No. 7,087,337 describes an assembly for a fuel cell including an electrically conductive fluid distribution element with a flow field disposed on a surface of the element, wherein the flow field includes a plurality of channels for carrying the gaseous reactants of the fuel cell. The assembly also includes an electrically conductive member disposed at the surface of the element to serve as a gas diffusion media. As illustrated in FIG. 6 (prior art), the channels of the element include a plurality of sidewalls (61,62) formed in various orientations, and the orientations of the sidewalls form a cross-sectional geometry of the channel such that water collection regions are formed at an interface of the electrically conductive fluid distribution element and the electrically conductive member, and at a bottom portion of the channel. When using a ramped sidewall geometry for the channels, the water is drawn into the sharpest corner of the channel. However, the gas diffusion layer is typically hydrophobic, which makes them poor surfaces to form sharp corners for accumulating water. Furthermore, for water to accumulate at the bottom portion of the channel, the depth of the channel needs to be shallow, which is limited by manufacturability and constrains the flow channel dimensions and design flexibility.

Accordingly, there remains a need for improved techniques to remove liquid water in fuel cells. The present invention addresses this need and provides further related advantages.

BRIEF SUMMARY

Briefly summarized, a flow field plate for an electrochemical fuel cell comprises a first flow field; an opposing second flow field; and at least one flow channel formed in the first flow field, the at least one flow channel comprising a first side and an opposing second side separated by an open-faced top and a bottom surface having a depth ($D_f$) relative thereto; and a first side channel formed in a portion of the open-faced top and in a portion of the first side along a continuous length of the at least one flow channel, the first side channel comprising a first side wall and a first bottom wall having a depth ($D_s$) relative to an open-faced top of the first side channel; wherein the first side wall of the first side channel and the first bottom wall of the first side channel form an obtuse angle in cross-section relative to the at least one flow channel; and the depth of the bottom surface of the at least one flow channel ($D_f$) is greater than the depth of the first bottom wall of the first side channel ($D_s$).

In further embodiments, an electrochemical fuel cell comprises a membrane electrode assembly comprising an anode, a cathode, and a proton exchange membrane interposed therebetween; and a flow field plate comprising a first flow field; an opposing second flow field; and at least one flow channel formed in the first flow field, the at least one flow channel comprising a first side and an opposing second side separated by an open-faced top and a bottom surface having a depth ($D_f$) relative thereto; and a first side channel formed in a portion of the open-faced top and in a portion of the first side along a continuous length of the at least one flow channel, the first side channel comprising a first side wall and a first bottom wall having a depth ($D_s$) relative to an open-faced top of the first side channel; wherein the first side wall of the first side channel and the first bottom wall of the first side channel form an obtuse angle in cross-section relative to the at least one flow channel; and the depth of the bottom surface of the at least one flow channel ($D_f$) is greater than the depth of the first bottom wall of the first side channel ($D_s$).

In some embodiments, the ratio of the cross-sectional width of the open-faced top of the at least one flow channel to the cross-sectional width of the open-faced top of the first side channel is at least about 2:1. In other embodiments, the ratio of the depth of the bottom of the at least one flow channel to the depth of the first bottom wall of the first side channel is greater than about 1:1 and less than about 2:1. In yet other embodiments, the cross-sectional area of the at least one flow channel is at least about 3 times of the cross-sectional area of the first side channel.

These and other aspects of the invention will be evident upon reference to the following detailed description and attached drawings.

DETAILED DESCRIPTION

Figure 1:
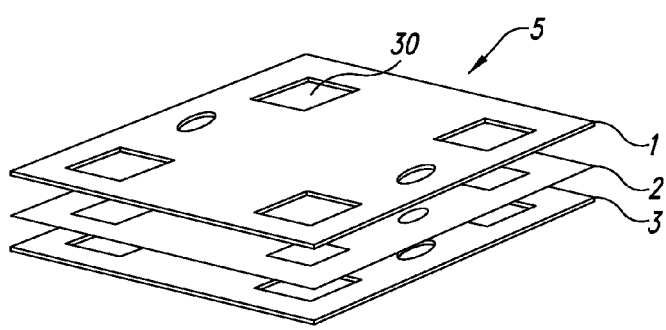
FIGS. 1 to 4 show a fuel cell stack configuration according to the prior art.
Figure 2:
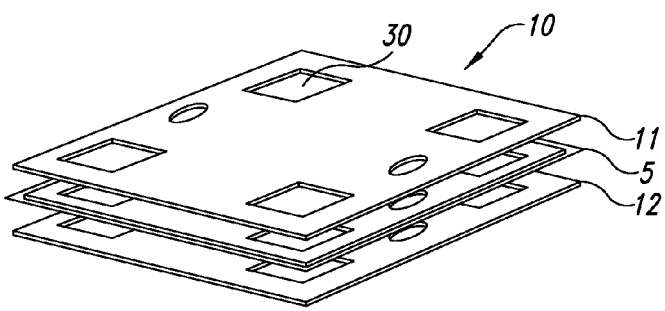
Figure 3:
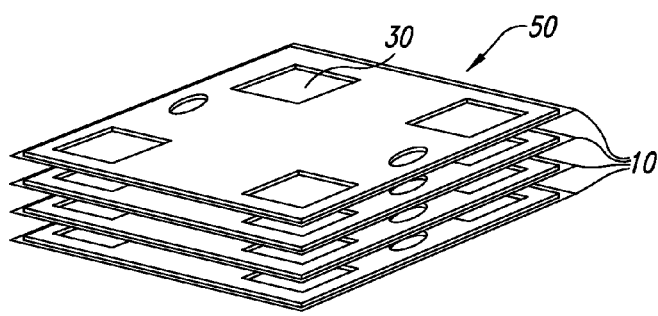
Figure 4:
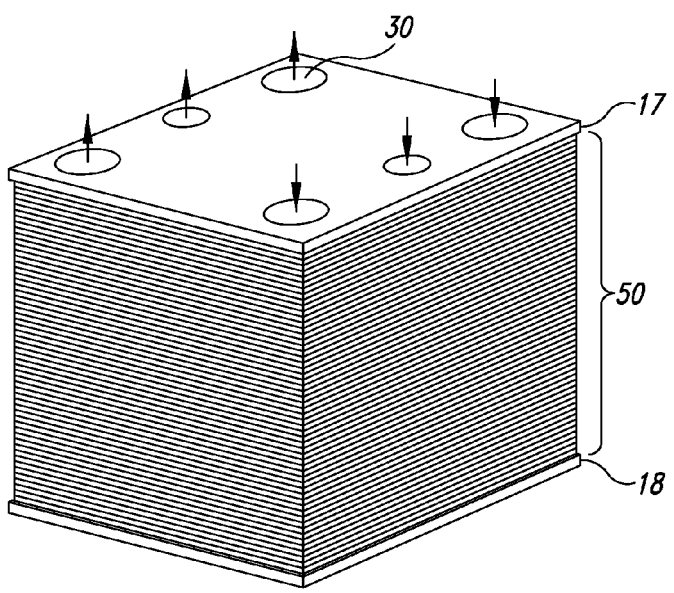
Figure 5:
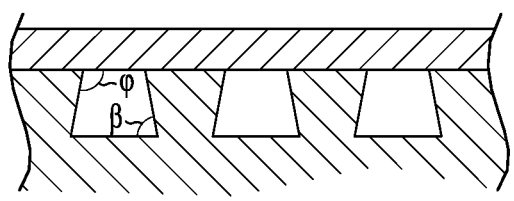
FIG. 5 shows a cross-sectional view of a flow channel configuration according to the prior art.

In the following description, certain specific details are set forth in order to provide a thorough understanding of the various embodiments. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to". Also, reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present context, "continuous flow channel" means that the flow channel spans from the fuel cell inlet to the fuel cell outlet without any discontinuities, thereby allowing fluids to flow therein from the fuel cell inlet to the fuel cell outlet. Similarly, "continuous side channel" means that the side channel spans from the fuel cell inlet to the fuel cell outlet without any discontinuities, thereby allowing fluids to flow therein from the fuel cell inlet to the fuel cell outlet.

As mentioned in the foregoing, the presence of liquid water in the flow channels typically creates random and varying flow resistance in fuel cells because liquid water blocks or clogs the gas flow passage. To address this problem, the flow field plates are designed with continuous small side channels formed in an upper top portion of the flow channel adjacent the gas diffusion layer (GDL) to attract liquid water away from the surface of the GDL from under the landings of the flow field plate and/or from the main flow channel and to an area that does not significantly hinder gas flow in the main flow channel.

It has been discovered that fuel cells with such continuous side channels improve flow resistance stability in comparison to fuel cells with conventional flow field channel designs. This is demonstrated by improved pressure drop stability measured by the standard deviation of the change in pressure drop over time. Without being bound by theory, a higher stability in pressure drop means that there is less water in the flow field channel that, if present, would result in poor flow characteristics (i.e., more pressure drop "noise"), as well as voltage variability from cell to cell due to reactant starvation. For example, it is estimated that with a standard deviation of 3.5%, the minimum required oxidant stoichiometry to sustain a given load can vary by more than 12%. Thus, the minimum oxidant stoichiometry that is supplied to the fuel cell must also be increased by at least 12% to account for pressure drop instability. Furthermore, it was observed that the pressure drop variation at different temperatures (and, thus, water content in the fuel cell) was also low for fuel cells utilizing such side channels. Typically, a low variance in pressure drop is desired so that the oxidant blower or compressor will experience more constant conditions and, thus, the oxidant blower or compressor can be more accurately sized. For example, if the oxidant blower or compressor is too big, parasitic losses would be unnecessarily high. On the other hand, if the oxidant blower or compressor is too small, reactant starvation would occur in the cells with higher flow resistance.

Figure 7:
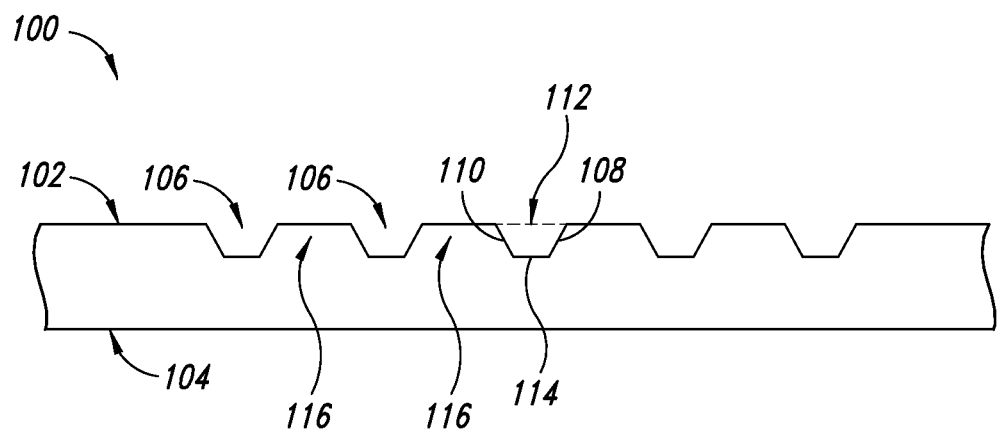
FIG. 7 shows a cross-sectional view of a flow field plate according to one embodiment.

FIG. 7 illustrates a flow field plate in cross-section according to one embodiment (side channel features not shown for ease of understanding). Flow field plate 100 includes a first flow field surface 102 and an opposing second flow field surface 104. (In a fuel cell configuration, a GDL is placed adjacent first flow field surface 102.) First flow field surface 102 includes continuous flow channels 106 defined by a first side 108 and an opposing second side 110 that are separated by open-faced top 112 and bottom surface 114. Each of flow channels 106 are separated by landings 116. For better manufacturability, the cross-sectional width of the flow channel should generally decrease in a direction away from open-face top 112 and towards bottom surface 114 (i.e., the cross-sectional width of open-faced top 112 is greater than the cross-sectional width of bottom surface 114). Similarly, second flow field surface 104 may also include flow channels (not shown). Although not shown in FIG. 7, a typical flow field plate will have manifolds for supplying and removing reactants, such as manifolds 30 shown in FIGS. 1 to 4. The manifolds may be internal manifolds (formed in the plate) or external manifolds (attached to the plate). One skilled in the art will appreciate that flow field channels typically extend continuously from an inlet manifold to an outlet manifold of the flow field plate.

Figure 8:
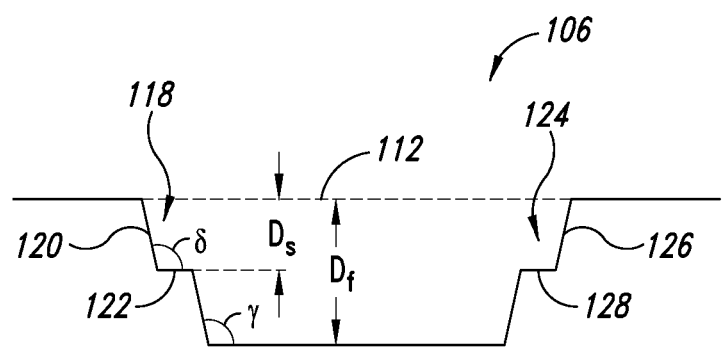
FIG. 8 shows an exploded cross-sectional view of a flow channel configuration according to one embodiment.

With reference to FIG. 8, which is an exploded view of flow channel 106 in cross-section, flow channel 106 includes a first side channel 118 formed in a portion of open-faced top 112, which is typically adjacent and fluidly connected to a GDL (not shown), and in a portion of first side 108 along the continuous length of flow channel 106 as depicted in FIG. 7. First side channel 118 is fluidly connected to the main flow channel section of flow channel 106 and is defined by a first side wall 120 and a first bottom wall 122. Similarly, second side channel 124 is formed in a portion of open-faced top 112, which is also typically adjacent and fluidly connected to the GDL (not shown), and in a portion of second side 110 (as shown in FIG. 7) along the continuous length of flow channel 106. Second side channel 124 is also fluidly connected to the main flow channel section of flow channel 106 and is defined by a second side wall 126 and a second bottom wall 128. Preferably, first side wall 120 and first bottom wall 122 form an obtuse angle $\delta$ in cross-section to help facilitate manufacturing processes, such as embossing, machining, and molding. Similarly, second side wall 126 and second bottom wall 128 preferably form an obtuse angle $\delta$ in cross-section.

Without being bound by theory, capillary-driven flow can occur in a corner provided that the Concus-Finn condition is met, where the Concus-Finn condition is defined by formula (I):

$$\theta < \pi/2 - \alpha \qquad (I)$$

where $\theta$ is the static contact angle of the surface and $\alpha$ is the half-angle of the corner. Therefore, the first and second side channels are designed to be a particular size, shape and location to wick water away from the surface of the GDL and the main channel by creating capillary-driven corner flow. Since water is wicked away into an area outside of the main flow channel area, flow resistance variability is decreased and pressure drop stability is improved.

For example, the cross-sectional depth of first and second side channels 118, 124 ($D_s$) should be deep enough so that liquid water is drawn slightly away from the gas diffusion layer and to side channels 118, 124 (i.e., outside of the main flow channel area of flow channel 106), thereby removing liquid water droplets on the surface of the GDL that may contribute to flow resistance variation and/or gas diffusion blockage. In addition, the cross-sectional depth of first and second side channels 118, 124 ($D_s$) should be less than the cross-sectional depth of flow channel 106 ($D_f$) so that water can be drawn more easily to the side channel from the surface of the GDL than into the main flow channel area. Without being bound by theory, as mentioned in the foregoing and as shown in FC-5 in the Examples section, it is believed that water droplets typically do not wick into a corner formed by the flow field plate and the gas diffusion layer because the gas diffusion layer is generally hydrophobic, which makes it a poor corner to contain water (i.e., violates the Concus-Finn condition). However, by providing a corner that is located away from the surface of the gas diffusion layer as well as the bulk of the flow channel and is appropriately sized and shaped, liquid water can wick away from the surface of the GDL by capillary-driven corner flow into the corner without having water accumulate in the bulk of the flow channel. As a result, the depth of flow channel 106 is not limited because it only functions to provide reactant flow. Furthermore, first and second side channels 118, 124 are preferably continuous and fluidly connected to the outlet or outlet manifold of the fuel cell so that excess liquid water can be collected everywhere in first and second side channels 118, 124 along the continuous length of flow channel 106, and excess water can flow and be removed from first and second side channels 118, 124 at the outlet or outlet manifold of flow channel 106.

Figure 9:
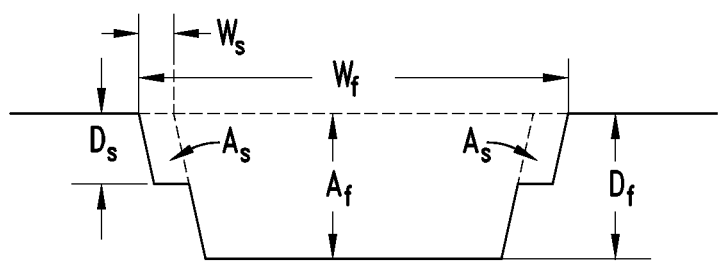
FIG. 9 shows an exploded cross-sectional view of a flow channel configuration according to one embodiment.

In some embodiments, flow channel 106 is much larger than first and second side channels 118, 124. With reference to FIG. 9, the ratio of cross-sectional depth of the flow channel, $D_f$ (i.e., distance from the open-faced top of the flow channel to the bottom of the flow channel), to the cross-sectional depth of the of the first side channel, $D_s$ (i.e., distance from the open-faced top of the side channel to the bottom of the side channel), is greater than about 1:1 but less than about 2:1. Further, the cross-sectional width of the open-faced top of flow channel 106, $W_f$, should be greater than that of the open-faced top of first and second side channels 118, 124, $W_s$. In some embodiments, the ratio of the cross-sectional width of the open-faced top of the flow channel, $W_f$, to the cross-sectional width of the open-faced top of first side channel, $W_s$, is at least about 5:1, and in further embodiments, at least about 10:1. In other embodiments, the cross-sectional area of the main flow channel, $A_f$, is at least 3 times the total cross-sectional area of each of the side flow channels, $A_s$, and in further embodiments, at least 5 times the cross-sectional area of each of the side flow channels. In some embodiments, obtuse angle δ of first and second side channels 118, 124 may be the same or may be smaller than obtuse angle γ of flow channel 106. Without being bound by theory, by employing an obtuse angle δ in first and second side channels 118, 124 that is smaller than obtuse angle γ of flow channel 106, water is more likely to be drawn into side channels 118, 124.

In one embodiment, first major flow field surface 102 may be an anode or cathode flow field and second major flow field surface 104 may be a coolant flow field. In another embodiment, first major flow field may be an anode or cathode flow field, and second major surface may be the other of the cathode or anode flow field. Flow field plate 100 may be any suitable material, such as, but not limited to, graphitic, carbonaceous, or metallic, and combinations thereof. The first major flow field may comprise a coating on its surface, such as a hydrophilic coating. Without being bound by theory, such a coating will lower the surface tension (i.e., decrease contact angle) of any water droplets that form in the flow channel so that water can be wicked more easily into the side channels.

As one of ordinary skill in the art will appreciate, the flow field plate may be incorporated into an electrochemical fuel cell by placing a membrane electrode assembly between two flow field plates such that the gas diffusion layers of the membrane electrode assembly are adjacent to the flow field plate. Further incorporation of the electrochemical fuel cell into a fuel cell stack and system will be easily determined by one of ordinary skill in the art.

Although the corners of the side channels are shown to be sharp corners, rounded corners may be used without affecting the function of the side channels, so long as the side channels comprise a side wall and a bottom wall that form an obtuse angle and the depth of the bottom wall is less than the depth of the flow channel. Furthermore, first side channel and second side channel may have the same or different dimensions. For example, width of second side channel, $W_s$, and depth of second side channel, $D'_s$, may be different from the width of first side channel, $W_s$, and the depth of first side channel, $D_s$. In addition, while two side channels are shown in FIGS. 8 and 9, it is contemplated that water management may still be improved even if the flow field channel incorporates only one of such side channels.

The following examples are provided for the purpose of illustration, not limitation.

EXAMPLES

Figure 6:
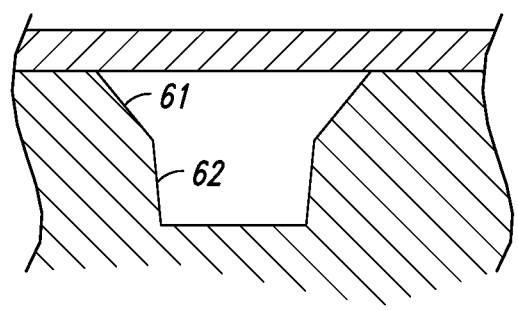
FIG. 6 shows a cross-sectional view of another flow channel configuration according to the prior art.

Six cathode flow field plates were machined with the flow field channel dimensions specified in Table 1. The five oxidant flow field plates FC-1 to FC-5 had side channels on both sides of the flow channel while the Baseline did not contain any side channels. In addition, the side channels of FC-5 do not include a side wall and a bottom wall in its side channels, but instead has a sloped wall (see FIG. 6). The flow field plates were assembled into fuel cells with the same anode flow field plate and MEA for evaluating their operational characteristics.

TABLE 1

Flow field channel geometries

| Name | Baseline | FC-1 | FC-2 | FC-3 | FC-4 | FC-5 |
|---|---|---|---|---|---|---|
| Number of Channels | 28 | 11 | 18 | 17 | 28 | 28 |
| Landing Width, $W_l$ (mm) | 1.03 | 1.39 | 1.00 | 1.39 | 0.50 | 0.65 |
| Channel Width, $W_f$ (mm) | 0.64 | 2.86 | 1.53 | 1.29 | 1.07 | 1.02 |
| Channel Depth, $D_f$ (mm) | 0.77 | 0.78 | 0.68 | 0.78 | 0.78 | 1.00 |
| Side channel width, $W_s$ (mm) | N/A | 0.21 | 0.26 | 0.24 | 0.24 | 0.25 |
| Side channel depth, $D_s$ (mm) | N/A | 0.35 | 0.45 | 0.45 | 0.45 | 0.25 |

The fuel cells of Table 1 were operated in a vertical orientation (reactant inlet at the top, reactant outlet at the bottom) at 160 Amps with different coolant temperature differentials to evaluate the oxidant differential pressure exhibited by the fuel cell during operation. The operating conditions are set out in Table 2.

TABLE 2

Operating conditions

| Temperature | 65° C. coolant inlet; 70° C., 75° C., or 78° C. coolant outlet |
|---|---|
| Inlet Dew Point | 67° C. (fuel and oxidant) |
| Fuel | 75% hydrogen/balance nitrogen |
| Oxidant | air (21% oxygen/79% nitrogen) |
| Reactant inlet pressure | 50-200 mbarg (fuel and oxidant) |
| Reactant stoichiometry | 1.3 for fuel, 1.8 for oxidant |

Figure 10:
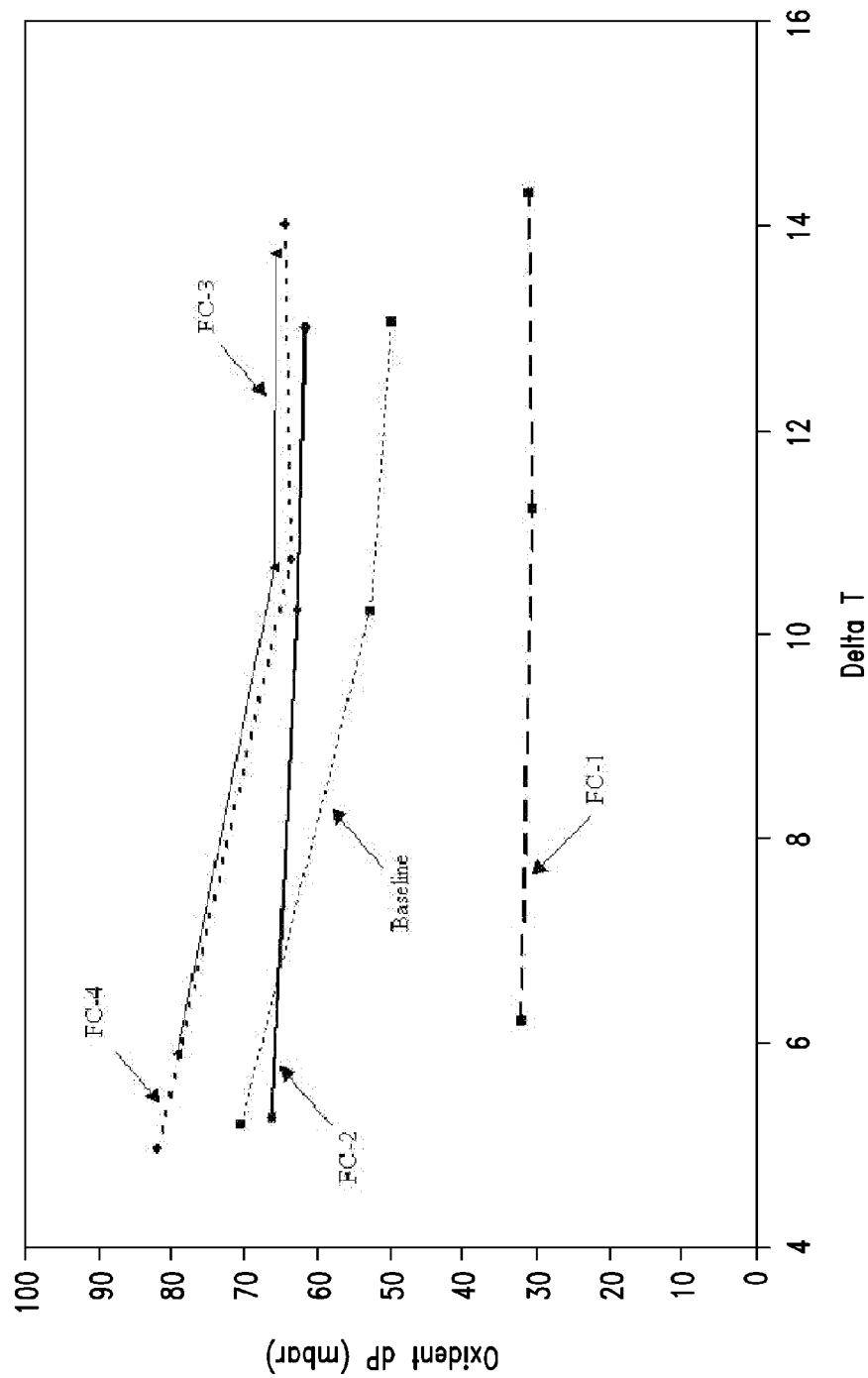
FIG. 10 shows the difference in pressure drop variation at different coolant outlet temperatures for five fuel cells operating at the same conditions.

FIG. 10 shows the difference in pressure drop at different coolant temperature differentials to observe the pressure drop variation at different operating conditions. (A larger coolant temperature differential indicates higher coolant outlet temperatures and, thus, typically less water accumulation in the fuel cell.) FC-1 and FC-2 showed much lower pressure drop variation than the Baseline, FC-3, and FC-4. Without being bound by theory, it is believed that the side channels of FC-3 and FC-4 were too similar to that of the main flow channel dimensions and, thus, did not show a marked improvement in pressure drop variation. For example, the cross-sectional area of the main channel of FC-3 was less than 2.5 times the total cross-sectional area of the side channels. Similarly, the cross-sectional area of the main channel of FC-4 was less than 2 times the total cross-sectional area of the side channels. Conversely, the cross-sectional area of the main channel of FC-1 was almost 10 times the total cross-sectional area of the side channels, and cross-sectional area of the main channel of FC-2 was more than 3 times the total cross-sectional area of the side channels. In addition, the cross-sectional width of the main channel of FC-3 and FC-4 were less than 2 times the total cross-sectional area of their respective side channels.

Figure 11:
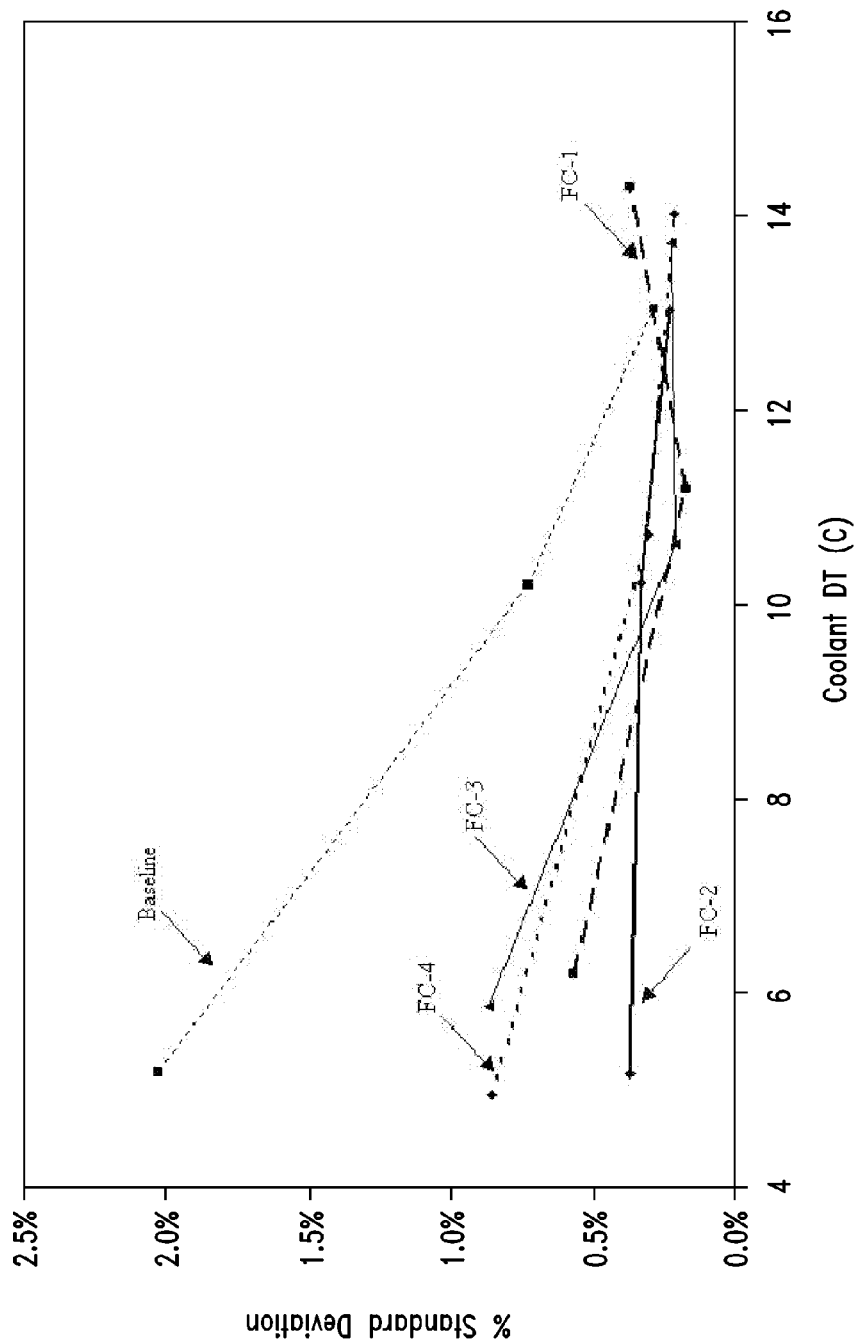
FIG. 11 shows the difference in pressure drop stability at different coolant outlet temperatures for five fuel cells operating at the same conditions.

However, despite this observation, both FC-3 and FC-4 still showed similar pressure drop stability as FC-1 and FC-2, as measured by the standard deviation of the pressure drop (see FIG. 11). Therefore, although FC-3 and FC-4 showed some variation in pressure drop at different coolant temperature differentials, FC-3 and FC-4 still exhibited improved pressure drop stability compared to Baseline.

Figure 12:
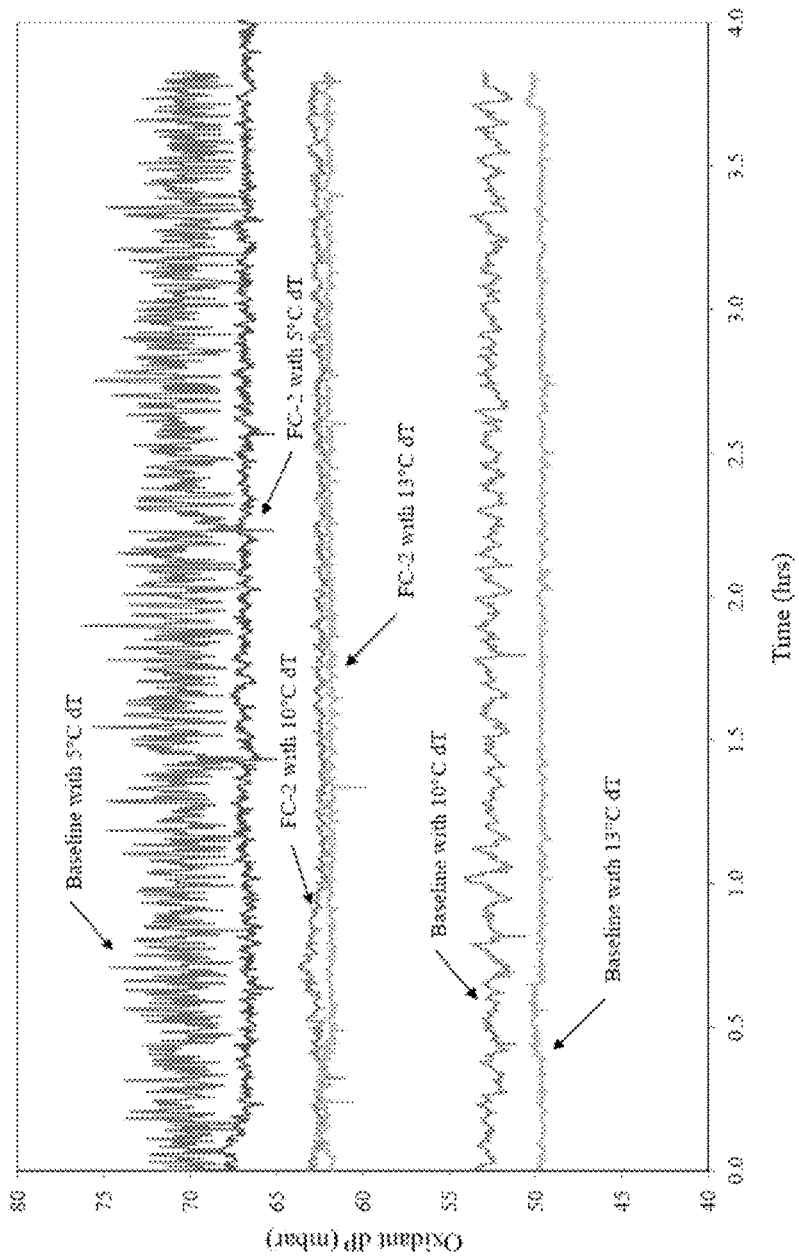
FIG. 12 shows the pressure drop stability over time at different coolant outlet temperatures for two fuel cells operating at the same conditions.

A more detailed look at the results of the Baseline fuel cell and FC-2 is shown in FIG. 12. It is evident that the oxidant differential pressure stability for both fuel cells increased as the coolant temperature differential decreased, which is expected because there is typically less liquid water at higher operating temperatures (i.e., larger coolant temperature differential). However, FC-2 exhibited greater stability in oxidant differential pressure, as measured by the standard deviation of the pressure drop, as well as lower variability in the oxidant differential pressure at all coolant temperature differentials in comparison to the Baseline.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing, it will be appreciated that, although specific embodiments have been described herein for the purpose of illustration, various modifications may be made without departing from the spirit and scope of the invention. Accordingly, the invention is not limited except by the appended claims.

What is claimed is:

1. A flow field plate for an electrochemical fuel cell comprising:
    a first flow field surface;
    an opposing second flow field surface; and
    at least one flow channel formed in the first flow field surface, the at least one flow channel comprising:
        a first side and an opposing second side separated by an open-faced top and a bottom surface having a depth ($D_f$) relative thereto; and
        a first side channel formed in a portion of the open-faced top and in a portion of the first side along a continuous length of the at least one flow channel, the first side channel comprising a first side wall and a first bottom wall having a depth ($D_s$) relative to an open-faced top of the first side channel such that the first side wall is adjacent to and in contact with the first flow field surface;
    wherein
        the first side wall of the first side channel and the first bottom wall of the first side channel form an obtuse angle in cross-section relative to the at least one flow channel;
        the depth of the bottom surface of the at least one flow channel ($D_f$) is greater than the depth of the first bottom wall of the first side channel ($D_s$).

2. The flow field plate of claim 1, wherein a ratio of a cross-sectional width of the open-faced top of the at least one flow channel to a cross-sectional width of the open-faced top of the first side channel is at least 5:1.

3. The flow field plate of claim 1, wherein a ratio of a cross-sectional width of the open-faced top of the at least one flow channel to a cross-sectional width of the open-faced top of the first side channel is at least 10:1.

4. The flow field plate of claim 1, wherein a ratio of the depth of the bottom of the at least one flow channel ($D_f$) to the depth of the first bottom wall of the first side channel ($D_s$) is less than 2:1.

5. The flow field plate of claim 1, wherein a cross-sectional width of the at least one flow channel decreases in a direction away from the open-faced top and towards the bottom surface.

6. The flow field plate of claim 1, wherein a cross-sectional area of the at least one flow channel is greater than a cross-sectional area of the first side channel.

7. The flow field plate of claim 6, wherein a cross-sectional area of the at least one flow channel is at least 3 times of a cross-sectional area of the first side channel.

8. The flow field plate of claim 6, wherein a cross-sectional area of the at least one flow channel is at least 5 times of a cross-sectional area of the first side channel.

9. The flow field plate of claim 1, wherein the opposing second flow field is a coolant flow field.

10. The flow field plate of claim 1, wherein the first flow field is a cathode flow field and the opposing second flow field is an anode flow field.

11. The flow field plate of claim 1, further comprising a graphitic, carbonaceous or metallic material, or combinations thereof.

12. The flow field plate of claim 1, wherein the first flow field surface comprises a hydrophilic material on a surface thereof.

13. The flow field plate of claim 1, further comprising:
    a second side channel formed in a portion of the open-faced top and in a portion of the opposing second side along the continuous length of the at least one flow channel, the second side channel comprising a second side wall and a second bottom wall having a depth ($D'_s$) relative to an open-faced top of the second side channel;
    wherein
        the second side wall of the second side channel and the second bottom wall of the second side channel form an obtuse angle in cross-section relative to the at least one flow channel; and
        the depth of the bottom surface of the at least one flow channel ($D_f$) is greater than the depth of the second bottom wall of the second side channel ($D'_s$).

14. An electrochemical fuel cell, comprising:
    a membrane electrode assembly comprising an anode, a cathode, and a proton exchange membrane interposed therebetween; and
    a flow field plate comprising:
        a first flow field surface;
        an opposing second flow field surface; and
        a flow field adjacent the anode or the cathode and at least one flow channel formed in the flow field adjacent the anode or the cathode, the at least one flow channel comprising:
            a first side and an opposing second side separated by an open-faced top and a bottom surface having a depth ($D_f$) relative thereto; and
            a side channel formed in a portion of the open-faced top and in a portion of the first side along a continuous length of the at least one flow channel, the side channel comprising a side wall and a bottom wall having a depth ($D_s$) relative to the open-faced top of the side channel such that the side wall is adjacent to and in contact with the first flow field surface;
        wherein the side wall of the side channel and the bottom wall of the side channel form an obtuse angle in cross-section relative to the at least one flow channel;

the depth of the bottom surface of the at least one flow channel ($D_f$) is greater than the depth of the bottom wall of the side channel ($D_s$).

15. The electrochemical fuel cell of claim 14, further comprising:

a second flow field plate comprising a flow field adjacent the other of the anode or the cathode.

* * * * *

UNITED STATES PATENT AND TRADEMARK OFFICE
CERTIFICATE OF CORRECTION

PATENT NO. : 9,735,435 B2
APPLICATION NO. : 13/583176
DATED : August 15, 2017
INVENTOR(S) : Jeffrey Dean Glandt et al.

It is certified that error appears in the above-identified patent and that said Letters Patent is hereby corrected as shown below:

On the Title Page

Item (54) Title:
"FLOW FIELD PLATE FOR ELECTROCHEMICAL FUEL CELL" should read, --FLOW FIELD PLATE FOR ELECTROCHEMICAL FUEL CELLS--.

Signed and Sealed this
Eighth Day of May, 2018

Andrei Iancu
*Director of the United States Patent and Trademark Office*